United States Patent [19]
Mason

[11] 3,724,791
[45] Apr. 3, 1973

[54] OUTRIGGER MOUNT FOR FISHING BOATS

[76] Inventor: Paul A. Mason, 25 Middle Road, Palm Beach, Fla. 33480

[22] Filed: Apr. 26, 1971

[21] Appl. No.: 137,203

[52] U.S. Cl. ................................................248/42
[51] Int. Cl. ..............................................A01k 97/10
[58] Field of Search...................248/40, 42, 38, 122

[56] References Cited

UNITED STATES PATENTS

| 2,529,148 | 11/1950 | Fratt | 248/42 |
|---|---|---|---|
| 2,918,237 | 12/1959 | Boesch | 248/42 |
| 2,927,754 | 3/1960 | Davis | 248/40 |
| 2,958,491 | 11/1960 | Ackley | 248/42 |
| 3,014,679 | 12/1961 | Jepson | 248/42 |
| 3,063,668 | 11/1962 | Yohe | 248/42 |

FOREIGN PATENTS OR APPLICATIONS 208,309   5/1940   Switzerland............................248/42

Primary Examiner—Marion Parsons, Jr.
Attorney—Meredith P. Sparks

[57] ABSTRACT

The present invention provides an outrigger mount which includes a tubular socket for the reception of the butt end of an outrigger pole, the tubular socket being pivotally mounted on a bracket which is adapted for horizontal mounting, generally required on open type fishing boats, as well as for vertical mounting on boats with deck houses. The tubular socket is angled relative to the pivot which is in turn angled relative to the mounting surface to provide a compound angular relationship between the socket and the mounting surface. Indexing and detent means are provided whereby the outrigger pole may be selectively rotated to and locked in a raised or "stowed" position, extended or "fishing" positions and a lowered position for passing under bridges or the like.

10 Claims, 6 Drawing Figures

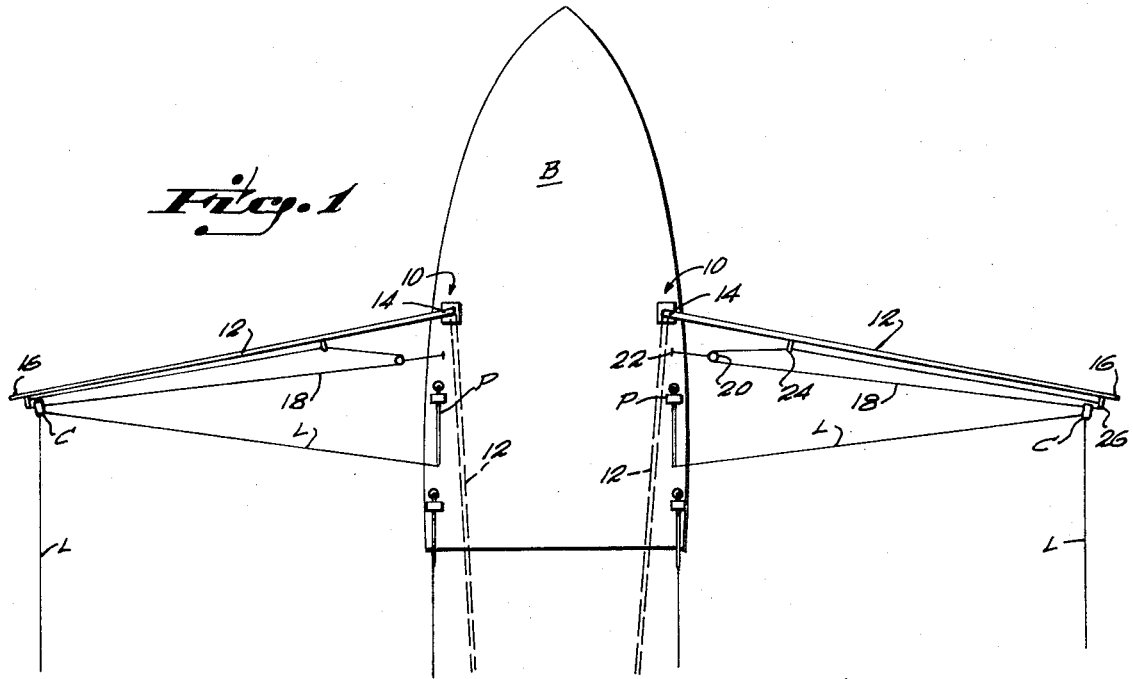
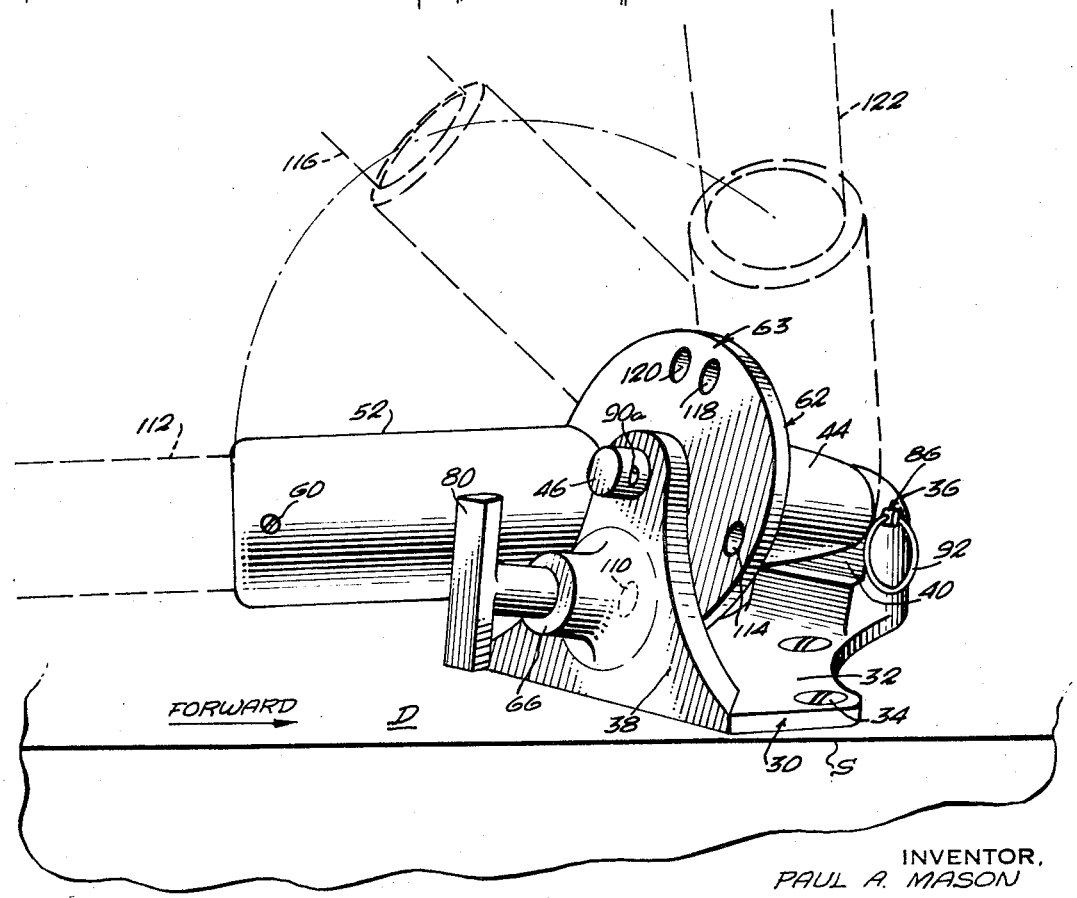

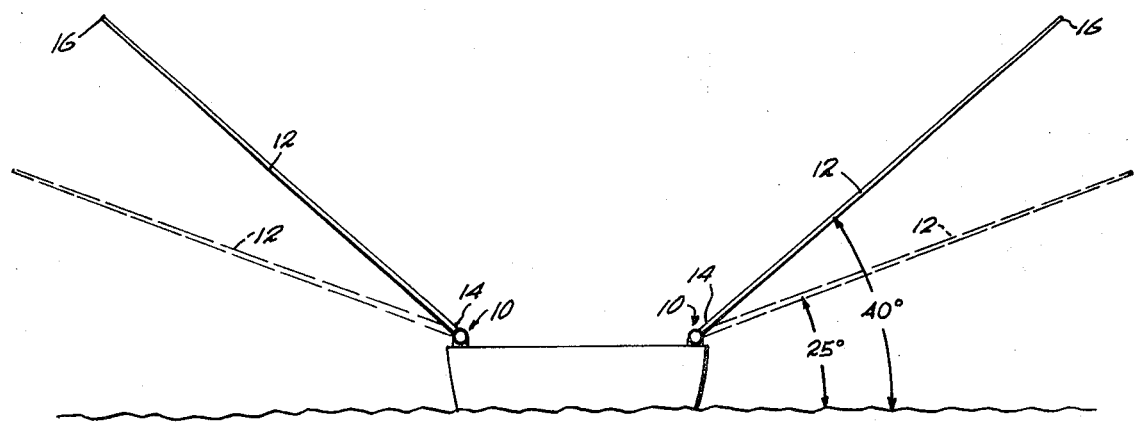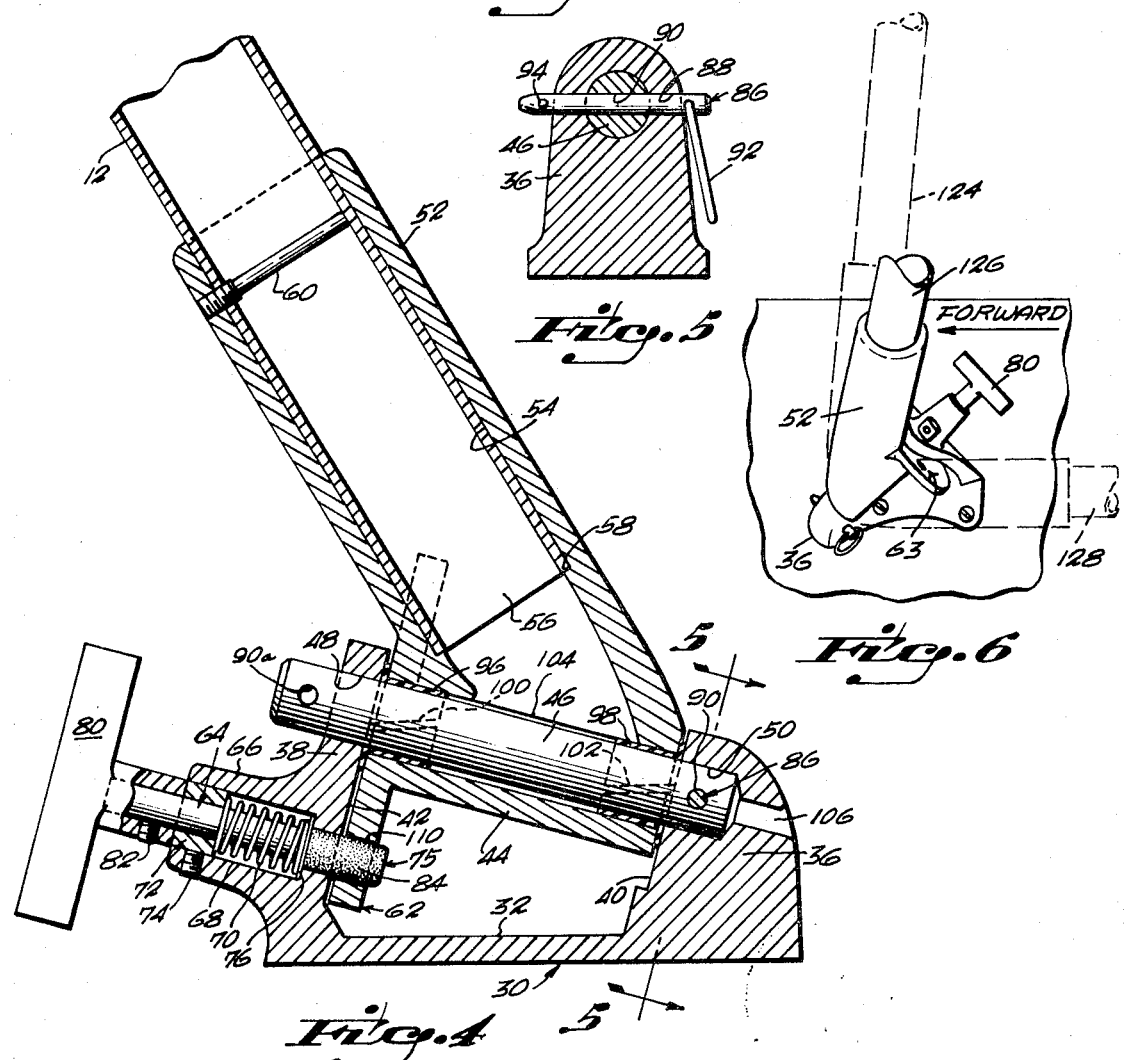

OUTRIGGER MOUNT FOR FISHING BOATS

STATE OF THE PRIOR ART

Various types of mounts have been provided for outrigger poles in the past, however, because of the nature of their usage, their performances have provided varying degrees of satisfaction. Some outrigger poles extend more than twenty feet outwardly from the boat when in their fishing position and due to the forces applied to the mount by a combination of the weight of the pole, the rolling of the boat, the action of the wind and the trolling of the fish bait from the extended tip end, a very sturdy structure is vital to providing satisfactory performance over a long period of time. Some outrigger mounts now in use provide bracing struts and rods to provide the necessary sturdiness. Such structures, in addition to being unsightly, present a hazard to the fishermen in moving about the boat and are unwieldy in operation when it becomes necessary to reposition the outrigger pole when approaching a bridge or when the fishermen have finished fishing.

The most desirable type of outrigger pole mount provides for movement of said poles between three general positions in varying planes and most mounts now in use provide varying types of knuckles, hinges and ball joints to provide for this movement.

Some outrigger pole mounts utilize telescoping or sliding joints however, these are particularly susceptible to corrosion and sticking, especially when used for salt water fishing. Also, as is perhaps well known, many small boats are towed on a trailer while others are kept in rack storage in large boat sheds at marinas and, consequently, it is often necessary to remove the outrigger poles from the mounts before towing or storing these boats.

Most outrigger mounts require a multiplicity of separate attachments to the boat structure in specific relation to each other thus requiring talented and time consuming installation and perhaps several areas where the boat structure must be reinforced.

Most outrigger mounts provide elongated sleeve sockets for slidingly receiving the butt ends of the poles and, because of the firm support necessary, a snug fit between the butt end and the socket and a substantial depth of penetration are essential. As a result, the poles very often are extremely difficult to remove from the sockets after a prolonged period of usage, particularly in salt water.

If the poles are unremovable from their sockets, it becomes necessary to dismount the portion of the mount which includes the tubular socket and, in many of the mounts presently in use, this requires the use of tools and may be quite time-consuming, the reverse procedure of reassembly being necessary before the next fishing trip.

BACKGROUND OF THE INVENTION

The outrigger mount of the present invention was engineered and designed to eliminate the objections to and the difficulties with the mounts now in use. The movement between the raised or stowed position, the extended or fishing positions, and the lowered position is provided by rotational movement of the sleeve socket, holding the outrigger, relative to a mounting bracket which is fixed to a suitable surface structure of a boat. Index holes are provided in a plate which is integral with the sleeve socket and a spring loaded detent pin is mounted in the bracket in a manner so as to selectively engage in any of the index holes. The index holes are located in the plate relative to the sleeve socket whereby the pole in said socket may be selectively rotated to and locked in any of a plurality of predetermined positions. One index hole is provided to establish the raised or stowed position, one hole for the lowered position and one, two or more holes to provide one, two, or more fishing positions.

A unique compound angular relationship is provided between the deck surface and the sleeve, when the outrigger mount is horizontally mounted, whereby the outrigger pole is moved through an arced path of travel when it is rotated from the fishing position, through the raised position, to a lowered position. This arced path of travel permits the outrigger pole to pass over or clear conventional fishing rods contained in rod holders in the aft portion of the boat, thereby eliminating the necessity of removing the rods from their holders. The specific angles making up the said compound angle relationship were chose to provide pole geometry which maximizes bait spread when trolling while maintaining the necessary vertical and horizontal angles between pole and water surface and pole and boat center line for correct functional operation. The specific compound angle also provides optimum positioning in both stowed and lowered positions and convenient guided paths of poles between positions (i.e. the pole is not unsupported in more than one plane at any time).

Another feature of the outrigger mount of the instant invention is that it is equally adaptable to being installed on horizontal surfaces, such as the deck of a small boat and vertical surfaces, such as the sides of deck houses, flying bridges or cockpit comings. The starboard and port mounts for both the horizontal and vertical installations are identical with the exception of the locations of the index holes, each pair for the respective installations having index holes in locations which are mirror images of each other.

When it is necessary to remove the outrigger poles from the boat for trailering or storage, it is removed in assembly with the sleeve socket by withdrawing a pivot pin retainer from the mounting bracket. This retainer is a conventional type of pin including a detent means on one end and a finger grip loop on the other end is removed or inserted by applying force. Therefore, no tools are required and the pole and socket assembly is removed by withdrawing the retainer pin with one finger, and sliding the pivot pin out of the bracket whereupon the socket and pole assembly are free of the mounting bracket. The socket and pole assembly is reinstalled by reversing the procedure, the time and effort required for removing or installing the assembly generally being considerably less than that required to remove or insert the outrigger pole from or into the sleeve socket. Other possible uses of this invention include (1) flag pole mount on boat or other structure enabling flag (and pole) to be lowered or raised without use of a halyard. Pole may be vertical or at any desired angle. (2) Radio antenna mount on boat or other structure where the antenna can be lowered conveniently for service (or in a house) or for passage under obstacles (as on a boat or other moving vehicle).

BRIEF DESCRIPTION OF DRAWINGS

FIG. 1 is a schematic illustration of a small boat having a typical outrigger pole installation in accordance with the present invention;

FIG. 2 is a stern view of the boat and outrigger pole installation of FIG. 1;

FIG. 3 is a perspective view of a horizontally installed outrigger mount of the instant invention, illustrating three positions of an outrigger pole installed therein;

FIG. 4 is a vertical, longitudinal, sectional view of the mount shown in FIG. 3 with the sleeve socket in a raised position;

FIG. 5 is a cross sectional view taken on line 5—5 in FIG. 4; and

FIG. 6 is a perspective view of the outrigger mount as installed in a vertical plane and illustrating three positions of the outrigger pole.

DETAILED DESCRIPTION OF THE INVENTION

In the drawings in which like reference numerals designate like or similar parts throughout the various views and with particular reference to the schematic illustrations in FIGS. 1 and 2, the numeral 10 generally designates the outrigger mounts installed in a generally horizontal plane on both the starboard and port side decks of an open boat B. FIGS. 1 and 2 schematically illustrate a typical outrigger installation with the outrigger poles extended in fishing positions. With particular reference to FIG. 1 the outrigger poles 12 are anchored at their inner or butt ends 14 in the mounts 10 and angle outwardly and rearwardly to tip ends 16. Each pole 12 is rigged with a continuous halyard 18 which passes around a pulley 20, anchored as at 22 to the boat, then outwardly through eyes 24 and 26 and back to the pulley. Fishing lines L from one of the conventional fishing rods P, contained in rod holders on each side of the aft portion of the boat B, pass outwardly to clamp attachment means C which are illustrated just inwardly from the tip ends 16 of each outrigger pole 12, and the fishing lines L trail rearwardly therefrom in the conventional manner when the boat is under way and trolling baits through the water.

The angulation between each extended outrigger pole and the keel line of the boat is critical only insofar as the outer tip end 16 must be positioned rearwardly of the butt end a distance sufficient to maintain the outer portion of the halyard 18 rearwardly of pulley 20.

With reference to FIG. 2, each pole 12 is illustrated extending outwardly and upwardly in a vertical plane in two positions. The position illustrated in full lines provides approximately 40° angulation relative to the surface of the water and approximately 25° in broken lines.

The above degrees of angulation are not intended as a limitation but are representative of a desirable angular range in a vertical plane and establish approximate desirable positionings of the outrigger poles by the mount of the present invention for fishing, while at the same time providing a necessary degree of rearward angulation as illustrated in FIG. 1.

The broken line representation of the outrigger poles 12 as illustrated inboard of the fishing rods P in FIG. 1 illustrate a desirable lowered positioning of the poles by horizontally installed outrigger mounts.

As best illustrated in FIGS. 3 and 4 the outrigger mount of the present invention provides a bracket portion 30, including a base plate 32, fixed to the side deck D of a boat, by nut and bolt means 34, adjacent the shear line S thereof, and a pair of spaced, upstanding webs 36 and 38. The web 36 is disposed generally toward the front of the boat and the web 38 toward the back thereof when the mount is installed and will be hereinafter referred to as the forward and backward webs 36 and 38.

As best illustrated in FIG. 4, the forward and backward webs 36 and 38 provide forwardly angulated, parallel, opposed faces 40 and 42 between which a pivot sleeve 44 is rotatably journalled on a pivot pin 46, extending through an aperture 48 in the rearward web 38 into a socket 50 in the forward web 36. The pivot pin 46 is perpendicular to the angulated faces 40 and 42, providing an angular relationship between the pivot sleeve 44 and the deck D.

A sleeve socket 52 is integral with and extends angularly outward and rearwardly from the pivot sleeve 44 and provides a round cylindrical bore 54 for sliding reception of the butt end 56 of an outrigger pole 12. The bore 54 is preferably provided with a stop shoulder 58 adjacent its inner end to seat said butt end and set screw means 60 may be provided to hold the pole 12 in its fixed position within the sleeve socket 52.

With further reference to FIGS. 3 and 4 the pivot sleeve 44 also includes an enlarged disc portion 62 at its rearward end, providing a plurality of index holes 63 spaced thereabout, all of which are radially equally, spaced relative to the axis of the pivot pin 46.

A detent pin 64 is slidably engaged through a boss portion 66 of the rear web 38 in a position to selectively, lockingly engage through the index holes 63, whereby said pivot sleeve 44 and socket sleeve 52 are locked against rotational movement in various positions as determined by the positioning of the respective holes 63.

An enlarged bore 68 is provided in the boss 66 for a compression spring 70, circumposed about the central portion of the detent pin 64, to provide forwardly directed compression forces between a collar 72, fixed in the rearward end of the bore 68 by a set screw 74, and a stop washer 76 seated against the shoulder provided by the enlarged forward end 75 of the detent pin. The stop washer 76 also seats against the forward wall of the bore 68 to limit the depth of penetration of the forward end 75 through the index holes 63.

A handle 80 is fixed to an outward extension of the detent pin 64 by a set screw 82 and the enlarged forward end is preferably coated with a synthetic wear-resistant material such as nylon or teflon as indicated at 84. The pin 64 and handle 80 are free to rotate about the axis of the pin to enable convenient positioning of the handle for grasping.

The pivot pin 64 is held in fixed relation to the webs 36 and 38 by a conventional removable pin means 86 which penetrates through appropriate axially aligned transverse bores 88 and 90 through the web 36 and the pivot pin 46. The removable pin means 86 as seen in FIG. 5 is of the type which provides a finger grip loop 92 on one end and a radially outwardly disposed, spring loaded ball 94 in the other end. This type of pin is insertable or removable only by the exertion of inward or outward force and provides for rapid removal of the unit comprised of the pivot sleeve 44, socket sleeve 52 and index disc 62, and when an outrigger pole 62 is in place in the socket sleeve 52, it is removable therewith.

After removal of the outrigger pole and pivot unit as just described, the pivot pin 46 may be reinstalled and locked in the aperture 48 and socket 50 by means of the removable pin means 86 to prevent loss thereof. The pivot pin 46, as best seen in FIG. 4, includes a second aperture 90a at its opposite end for insertion of the removable pin means 86 to provide a grip means for removal of the pivot pin 46 in the event that a little force is required.

The holes 90 and 90a are equally spaced from their respective ends making the pin reversible in use. As illustrated in FIG. 4, a pair of hat shaped bearings 96 and 98, preferably of a synthetic material such as nylon, may be employed at the respective ends of the pivot sleeve 44 and both bearings are slotted as indicated at 100 and 102 to provide through drainage for any water which may enter the cavity 104 formed within the bearing sleeve. The use of plastic bearing sleeves eliminates metal to metal contact and consequent corrosion or galling. They also eliminate the need for lubrication between moving parts. No lubrication is required anywhere in the design. A drainage hole 106 extends forwardly from the pivot pin, through the web 36, to cooperate with the slots 100 and 102 to discharge the water from the cavity 104.

The outrigger mount of the present invention as above described is applicable to both starboard and port mounts for both horizontal and vertical installations. The only modification required is in the locations of the various index holes 63. The perspective illustration in FIG. 3 is for a starboard, horizontal mount and an index hole 110 is shown engaged by the detent pin 64 to lock the outrigger pole 12 in its lowered position as indicated at 112. When the disc 62 is rotated clockwisely, as seen in FIG. 3 to an index hole 114, it is engageable by the detent pin 64 to lock the outrigger pole in the raised or stowed position 116, further clockwise rotation of the disc 62 to the closely adjacent holes 118 and 120 enables the operator to selectively lock the outrigger pole in either of the fishing positions illustrated in FIG. 2, one being indicated at 122 in FIG. 3.

FIG. 6 illustrates a typical vertical, port mount of the present invention in which the raised or stowed, extended or fishing and the lowered positions are indicated respectively at 124, 126 and 128. Two or more fishing positions may be provided and while only one index hole 63 is visible in this view, it is simply a matter of location of the respective index holes to establish the various positions as detailed relative to the horizontal mount.

For both the horizontal and vertical mounts, the index holes 63 in the respective starboard and port discs 62 are mirror images of each other, and the desirable angular relationships between the outrigger pole and the keel line of the boat and the water in both the fishing and lowered positions are maintained. The only significant difference between the outrigger pole positions for the horizontal mount and for the vertical mount is the angular relationship of said pole to the boat deck in its raised or stowed position. As seen in FIG. 3, the outrigger pole in its raised or stowed position 116 is angled substantially at 45° to the deck D and in FIG. 6, the pole 12 is angled slightly less than 90° relative to the deck D, these angles, are however, subject to variations as determined by the locations of the index holes 63. Both of these angular relationships between the outrigger pole and the deck are equally desirable and conventionally employed. With respect to both horizontal and vertical mount installations the base plate 32 may be angled slightly either way from its nominal position (before drilling holes for mounting bolts 34) to optimize functional geometry for each particular boat.

While a preferred form of the instant invention has been illustrated and described, it will be obvious to those skilled in the art that various changes and modifications can be made therein without departing from the true spirit of the invention as defined by the appended claims.

What is claimed is:

1. For attachment to a support structure of a boat, an outrigger mount of the type which selectively supports an outrigger pole, used for trolling, in any one of a plurality of fixed, angular relations to the boat comprising,
   A. a bracket means including,
      1. means for attachment to the support structure including a base, provided with a plurality of holes to receive attachment means therethrough,
      2. support means comprising forward and rearward, outwardly extending webs providing opposed, parallel faces having a predetermined degree of angularity to said base, said rearward web having a through bore and said forward web having a socket on a common axis therewith, said axis being perpendicular to said angulated faces;
   B. a pivot pin extending through said bore and having a first end seated in said socket providing a predetermined degree of angularity between the axis of said pivot pin and base as determined by said parallel faces;
   C. pivot means, rotatable about said pivot pin and including,
      1. mounting means for the outrigger pole extending outwardly from said pivot means at a predetermined degree of angularity which combined with the angle of said pivot pin, relative to said base, provides a compound angular relationship between said base and outrigger pole mounting means, and
      2. indexing means defining the plurality of fixed angular relations;
   D. detent means for selective engagement with said indexing means to lock said mounting means in any of the plurality of angular relations to the boat.

2. An outrigger mount as defined in claim 1 including axial aligned transverse bores through said forward web and first end of said pivot pin, and a removable pin means normally extending through said transverse bores.

3. An outrigger mount as defined in claim 2 in which said removable pin means includes a first end having a finger grip means and a second end having a depressable, radially disposed detent ball, said finger grip and detent ball extending outwardly of opposed sides of said forward web when fully inserted through said transverse bores.

4. An outrigger mount as defined in claim 1 in which said pivot means comprises a pivot sleeve disposed about said pivot pin between said opposed parallel faces.

5. An outrigger mount as defined in claim 4 in which said indexing means comprises an enlarged disc shaped rear portion of said pivot sleeve providing a plurality of index holes having equal radii relative to said pivot pin and predetermined circumferential spacings to provide for the plurality of fixed, angular relations to the boat consisting of raised, fishing and lowered positions.

6. An outrigger mount as defined in claim 5 in which said detent means comprises a spring loaded detent pin mounted through said rearward web which includes a front end portion extendible forwardly through said rearward web in a position to be selectively engaged through any of said index holes and a rear end portion, extending rearwardly of said rearward web, having a handle fixed thereto whereby said detent pin is retractable from any of said detent holes against the forces of said spring loading permitting said pivot sleeve, enlarge disc and mounting means to be selectively rotated to another position.

7. An outrigger mount as defined in claim 6 in which said enlarged disc provides one index hole to establish the raised position of the outrigger pole, one hole for the lowered position and a plurality of holes to provide fishing positions.

8. An outrigger mount as defined in claim 1 in which said pivot pin includes a second end, extending rearwardly, outwardly beyond said rearward web, including a transverse bore, similar to said transverse bore in said first end.

9. An outrigger mount as defined in claim 1 in which said outrigger pole mounting means comprises a sleeve socket for sliding reception of the butt end of an outrigger pole and a shoulder in said sleeve socket to limit the depth of penetration thereof, and set screw means to hold the outrigger pole in said sleeve socket.

10. An outrigger mount as defined in claim 5 in which the positioning of said plurality of index holes in the enlarged discs of two of said mounts are mirror images of each other to provide identical raised, fishing and lowered positions when said two mounts are respectively, horizontally mounted on the starboard and port sides of a boat.

* * * * *